US010778957B2

(12) United States Patent
Haq

(10) Patent No.: US 10,778,957 B2
(45) Date of Patent: Sep. 15, 2020

(54) ADJUSTABLE LIGHTING IN A STEREO-OPTICAL COUNTING DEVICE BASED ON AMBIENT LIGHTING

(71) Applicant: SHOPPERTRAK RCT CORPORATION, Chicago, IL (US)

(72) Inventor: Zafar Mohammed Haq, Arlington Heights, IL (US)

(73) Assignee: SHOPPERTRAK RCT CORPORATION, Chicago, IL (US)

( * ) Notice: Subject to any disclaimer, the term of this patent is extended or adjusted under 35 U.S.C. 154(b) by 0 days.

(21) Appl. No.: 16/147,394

(22) Filed: Sep. 28, 2018

(65) Prior Publication Data

US 2020/0107011 A1 Apr. 2, 2020

(51) Int. Cl.
*H04N 5/225* (2006.01)
*H04N 13/204* (2018.01)

(52) U.S. Cl.
CPC ......... *H04N 13/204* (2018.05); *H04N 5/2256* (2013.01)

(58) Field of Classification Search
CPC ........... G06K 9/00778; G06K 9/00771; G09G 3/3406
See application file for complete search history.

(56) References Cited

U.S. PATENT DOCUMENTS

| 6,148,097 A * | 11/2000 | Nakayama | G01M 11/0264 382/141 |
| 6,697,513 B1 * | 2/2004 | Nakayama | G01M 11/0278 382/141 |
| 10,178,506 B2 * | 1/2019 | Breuer | H04B 10/116 |
| 2006/0227862 A1 * | 10/2006 | Campbell | G06K 9/00778 375/240 |
| 2007/0156021 A1 * | 7/2007 | Morse | A61B 1/0019 600/167 |
| 2008/0015412 A1 * | 1/2008 | Hori | A61B 1/00096 600/109 |
| 2010/0128116 A1 * | 5/2010 | Sato | A61B 1/00045 348/65 |
| 2015/0098709 A1 * | 4/2015 | Breuer | G01C 3/08 398/118 |
| 2016/0261829 A1 * | 9/2016 | Olsson | G03B 37/005 |

\* cited by examiner

*Primary Examiner* — Paulos M Natnael
(74) *Attorney, Agent, or Firm* — Arent Fox LLP

(57) ABSTRACT

Techniques for adjusting a brightness of a field of view of a stereo-optical sensor device (e.g., of a system used to count individuals) are disclosed. According to an embodiment, the stereo-optical sensor device obtains, from a light sensor of the stereo-optical sensor device, a luminosity value of the field of view of the stereo-optical camera. The stereo-optical sensor device determines, as a function of the luminosity value, whether to adjust a brightness of one or more light sources. The stereo-optical sensor device adjusts, in response to the determination, the brightness of the one or more light sources.

17 Claims, 3 Drawing Sheets

ADJUSTABLE LIGHTING IN A STEREO-OPTICAL COUNTING DEVICE BASED ON AMBIENT LIGHTING

BACKGROUND

Embodiments disclosed herein generally relate to a counting system, and more particularly, to adjusting lighting in a field of view based on the ambient lighting conditions.

Generally, a counting system may track objects, such as individuals passing through one or more areas within the field of view of a camera of the counting system, and maintain a count of each object. The counting system may include multiple devices that serve various functions. However, in some cases, lighting within the field of view may be insufficient to allow the counting system to obtain an accurate count of individuals. For example, a counting system situated in an outdoor area may be affected by the time of day. Although the camera in the counting system may accurately identify individuals in daylight, if the lighting in the area is poor around the counting system (e.g., the counting system is installed away from a main light source), then image data captured by the camera can be affected by relatively low luminosity values, which can cause individuals within the field of view of the camera to be obscured and thus not counted.

SUMMARY

Embodiments disclosed herein provide a method for adjusting a brightness of a field of view of a stereo-optical sensor device having one or more light sources. The method generally includes obtaining, from one or more light sensors of the stereo-optical sensor device, a plurality of values indicative of a luminosity of the field of view of the stereo-optical camera. The method also generally includes determining, as a function of the plurality of values, whether to adjust a brightness of one or more light sources. The method also generally includes adjusting, in response to the determination, the brightness of the one or more light sources.

Another embodiment disclosed herein provides a computer-readable storage medium storing instructions, which, when executed, performs an operation for adjusting a brightness of a field of view of a stereo-optical sensor device having one or more light sources. The operation itself generally includes obtaining, from one or more light sensors of the stereo-optical sensor device, a plurality of values indicative of a luminosity of the field of view of the stereo-optical camera. The operation also generally includes determining, as a function of the plurality of values, whether to adjust a brightness of one or more light sources. The operation also generally includes adjusting, in response to the determination, the brightness of the one or more light sources.

Yet another embodiment disclosed herein provides an apparatus having a stereo-optical camera, one or more light sources, one or more light sensors, and a controller. The controller is to obtain, from the one or more light sensors, a plurality of values indicative of a luminosity of the field of view of the stereo-optical camera. The controller is also to determine, as a function of the plurality of values, whether to adjust a brightness of the one or more light sources. The controller is also to adjust, in response to the determination, the brightness of the one or more light sources.

In accordance with these and other objectives that will become apparent hereafter, the present disclosure will be described with particular references to the accompanying drawings.

DETAILED DESCRIPTION

This detailed description is presented in terms of programs, data structures or procedures executed on a computer or a network of computers. The software programs implemented by the system may be written in languages such as JAVA, C, C++, C #, Assembly language, Python, PHP, or HTML. However, one of skill in the art will appreciate that other languages may be used instead, or in combination with the foregoing.

Figure 1:
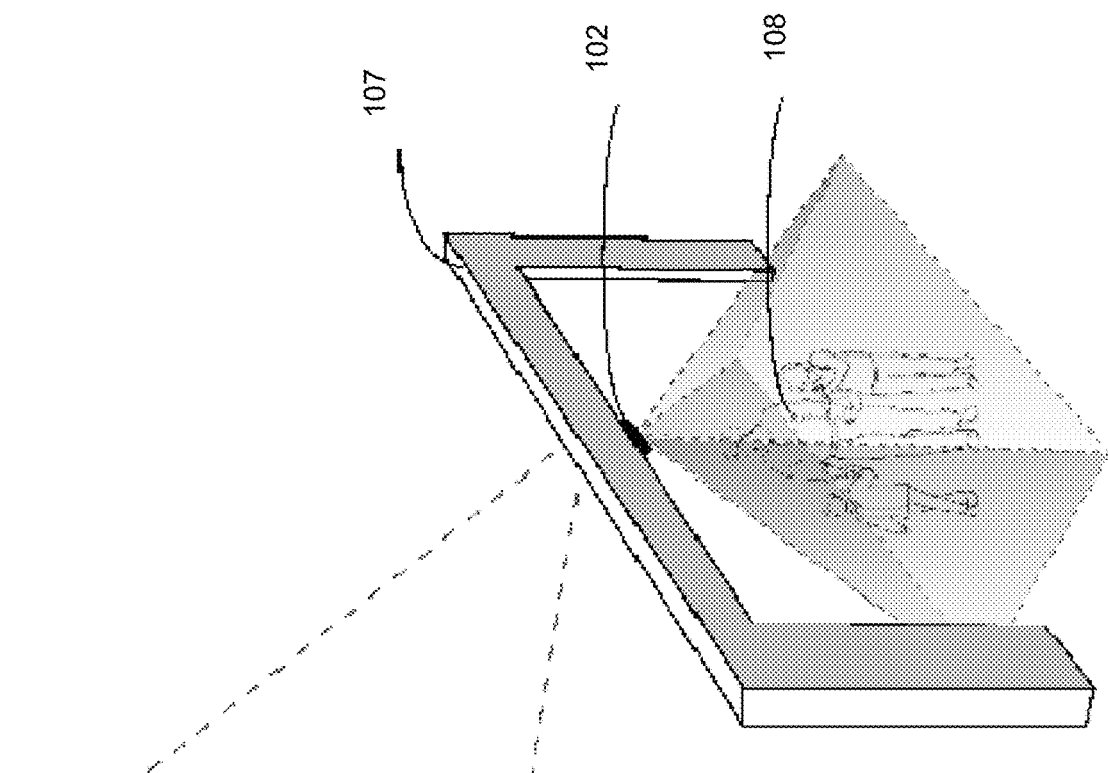
FIG. 1 illustrates an example environment including a stereo-optical sensor unit that is configured with an ambient lighting system.
Figure 1:
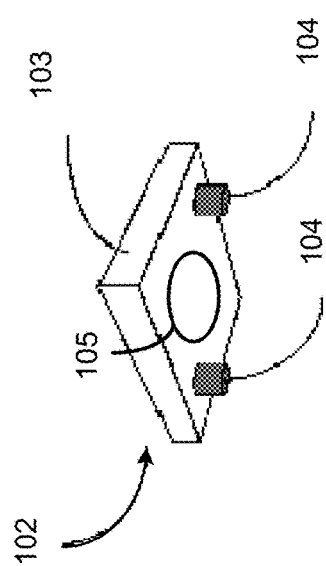

FIG. 1 illustrates an example environment in which a counting system is deployed in a retail setting 100. The retail setting 100 may be representative of a shopping center that has a number of retail units. Each retail unit may include a stereo-optical sensor unit 102. For example, the stereo-optical sensor unit 102 may be positioned at a ceiling height above an internal entrance 107 of the respective retail unit. A perspective view of the exterior of the stereo-optical sensor unit 102 is shown on the top corner of FIG. 1. Illustratively, the stereo-optical sensor unit 102 includes a housing 103 and camera lenses 104. The illustrative embodiment provides two camera lenses 104 that are positioned horizontally apart from one another. In using multiple camera lenses 104, the stereo-optical sensor unit 102 can measure depth or, in cases in which a distance between the stereo-optical sensor unit 102 and the ground is known, height.

Illustratively, a camera in the stereo-optical sensor unit 102 captures image data of individuals 108 entering and leaving the field of view thereof. Logic in the stereo-optical sensor unit 102 processes the image data. The stereo-optical sensor unit 102 includes logic to count each individual that visits the retail unit. The stereo-optical sensor unit 102 is also to report such counting data to a user. In the retail setting 100, the user may evaluate the counting data, e.g., for use in analyzing statistics such as sales conversion rates and visitor traffic. However, one concern is obtaining accurate counting data from the visitors entering and exiting a given retail unit at various times of day. One challenge to obtaining accurate data is in lighting of the field of view of the camera of the stereo-optical sensor unit 102. In the event that lighting in an area in which the stereo-optical sensor unit 102 is positioned is poor, then logic in the stereo-optical sensor unit 102 may fail to detect an individual. For instance, the stereo-optical sensor unit 102 may fail to extract a foreground object indicative of an individual from image data captured by the stereo-optical sensor unit 102. At various times of day, it is possible that lighting at a given retail unit may change. For example, lights installed at the retail unit may be dimmer during the day than at night, or vice versa, based on the layout of the retail unit.

Embodiments disclosed herein provide techniques for providing adjustable brightness for the stereo-optical sensor unit 102, such that the stereo-optical camera in the unit 102 may obtain a more accurate count of individuals passing through the field of view of the camera. In an embodiment, the stereo-optical sensor unit 102 includes one or more light sources 105 to provide ambient lighting for the field of view of the stereo-optical sensor unit 102. In this example, a light source 105 may be integral with the stereo-optical sensor unit 102. The light source 105 may be any kind of bulb that provides additional lighting for the field of view of the camera. In some embodiments, the light source 105 is a dimmable light bulb that is integrated within the stereo-optical sensor unit 102. Alternatively (or additionally), the light source 105 may be attached to the exterior of the stereo-optical sensor unit 102. Further, the stereo-optical sensor unit 102 is configured with light sensors that measure a luminosity of the field of view by the camera. Advantageously, doing so allows the stereo-optical sensor unit 102 to compare the luminosity against one or more thresholds to determine whether to increase or decrease a brightness of the light source 105.

Figure 2:
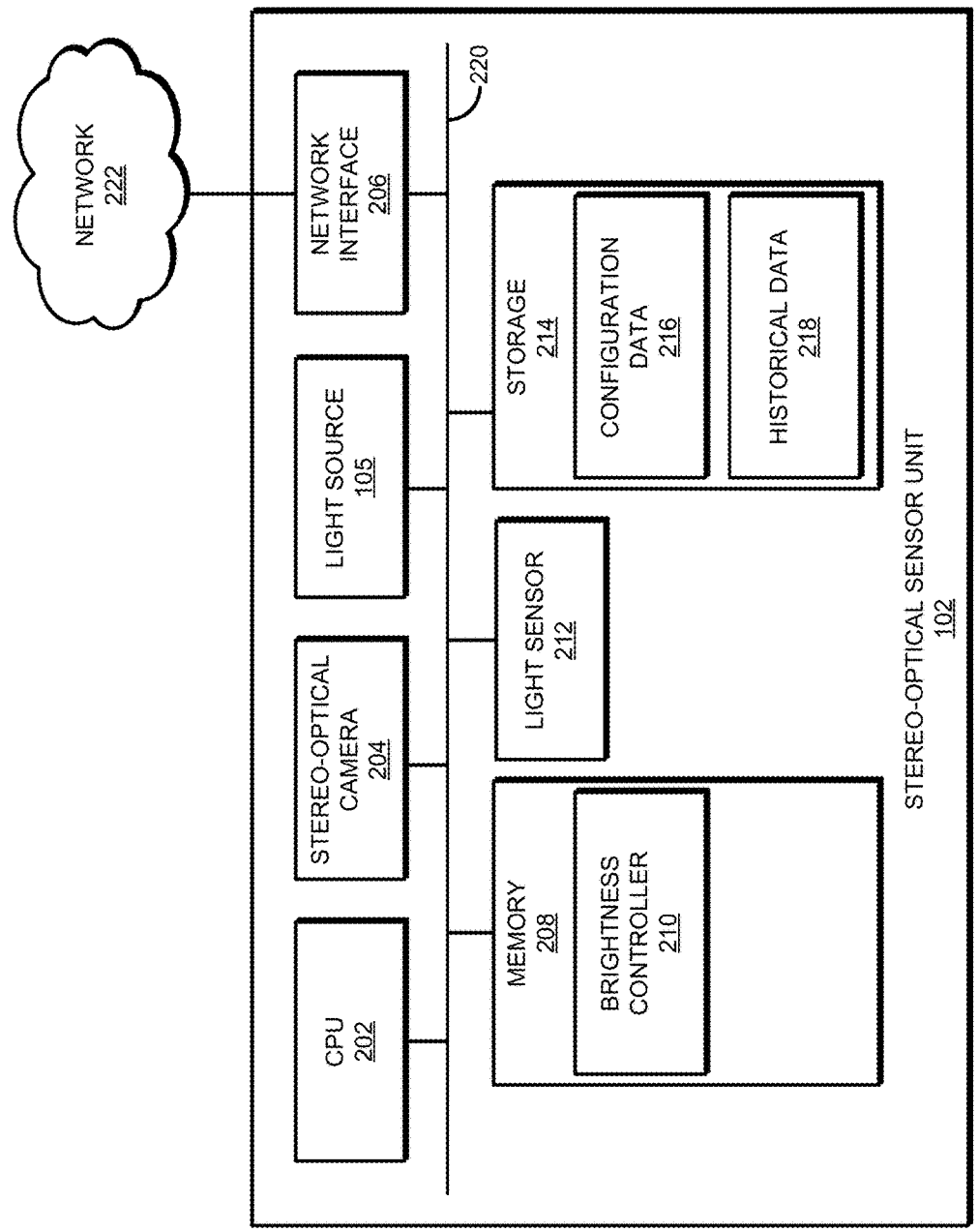
FIG. 2 illustrates the stereo-optical sensor unit shown in FIG. 1.

Referring now to FIG. 2, the stereo-optical sensor unit 102 includes, without limitation, a central processing unit (CPU) 202, a stereo-optical camera 204, the light source 105, a network interface 206, a memory 208, a light sensor 212, and a storage 214. Each of these components may be interconnected via an interconnect bus 220.

The CPU 202 retrieves and executes programming instructions stored in memory 208 as well as stores and retrieves application data residing in the storage 214. The bus 220 is used to transmit programming instructions and data between CPU 202, storage 214, network interface 206, light source 105, light sensor 212, and memory 208. Note, the CPU 202 is included to be representative of a single CPU. However, the CPU 202 may also be multiple CPUs, a single CPU having multiple processing cores, and the like. The memory 108 is generally included to be representative of a random access memory. The storage 110 may be a disk drive storage device. Although shown as a single unit, storage 110 may be a combination of fixed and/or removable storage devices, such as fixed disc drives, removable memory cards, or optical storage, network attached storage (NAS), or a storage area network (SAN).

The stereo-optical camera 204 includes multiple sensor lenses (e.g., camera lenses 104) to capture image data, which the storage 214 may temporarily maintain. The memory 208 includes program code logic to direct the stereo-optical camera 204 to capture image data. The program code may also identify individuals in the image data (e.g., using the techniques described above) for counting data. The network interface 206 may be embodied as any communication circuit, device, or collection thereof, capable of enabling communications over a network 222 (e.g., a local area network, the Internet, etc.) between the stereo-optical sensor unit 102 and other devices. For example, the stereo-optical sensor unit 102 may connect with a remote server that provides a management console for a user to receive counting data, configure parameters for the stereo-optical sensor unit 102, manually adjust a brightness in the light source 105, and the like.

As noted, the light source 105 is generally representative of an integrated dimmable light bulb, although other types of light sources 105 may be used. The light sensor 212 may be embodied as any type of hardware, software, and/or circuitry to measure luminosity of the field of view of the stereo-optical camera 204. For example, the light sensor 212 may be configured for gain and timing ranges to detect light ranges (e.g., between 0.1 to 40,000 Lux). The light sensor 212 may be configured to measure infrared and visible light. Further, the light sensor 212 may include one or more analog-to-digital converters to convert analog input received by the light sensor 212 to digital input. Doing so allows other components of the stereo-optical camera 204 to use such input, e.g., in determining whether to adjust the light source 105.

The memory 208 includes a brightness controller 210. Although depicted as part of the memory 208, the brightness controller 210 may be embodied as any type of hardware, software, or circuitry configured to adjust brightness of the light source 105 based on, e.g., measurements received by the light sensor 212 or manual configuration by the user (e.g., via a management console). The storage 214 includes configuration data 216 and historical data 218. The configuration data 216 may be embodied as any type of data indicative of a configuration of components in the stereo-optical sensor unit 216, such as brightness settings for the light source 105. For instance, the configuration data 216 may include one or more thresholds (or threshold ranges) that the brightness controller 210 evaluates relative to observed luminosity values (e.g., obtained from the light sensor 212). The brightness controller 210 may increase (or decrease) brightness if the observed luminosity value exceeds (or falls below) a specified threshold.

The brightness controller 210 is to store the historical data 218 relating to adjustments to the brightness of the light source 105. Further, the historical data 218 may be embodied as any type of data indicative of recorded instances in which the brightness controller 210 adjusted brightness of the light source 105. The brightness controller 210 may then use historical data 218, e.g., to predict instances in which brightness in the light source 105 should be adjusted. For example, the brightness controller 210 can evaluate the historical data 218 to determine that the luminosity value associated with the field of view of the camera typically occurs early in the evening hours. In response, the brightness controller 210 may automatically adjust the brightness of the light source 105 at a given point in time indicative of the evening hours. The brightness controller 210 may also report historical data 218 to a management console for review by the user.

Figure 3:
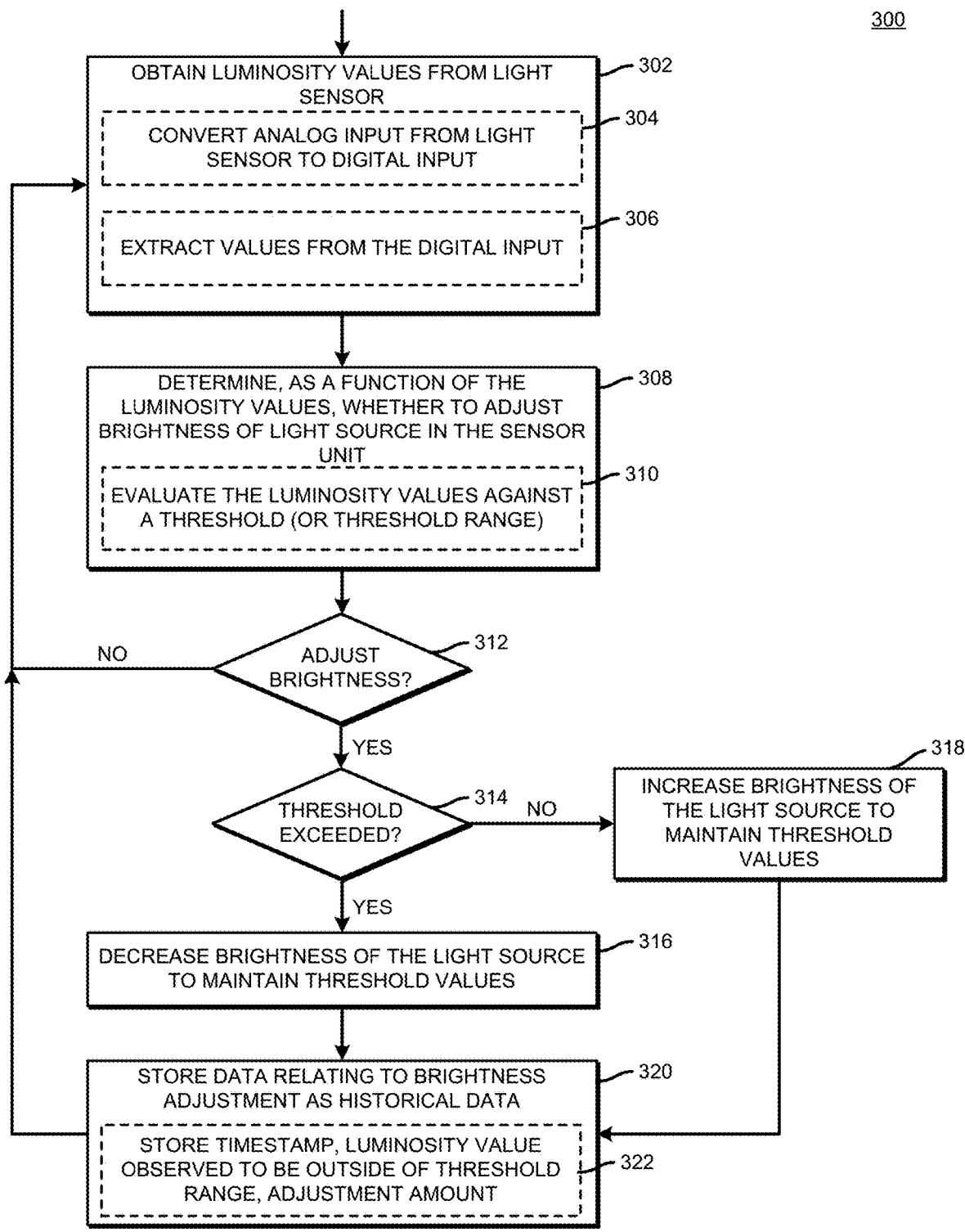
FIG. 3 illustrates a method for adjusting brightness of the stereo-optical sensor unit to obtain accurate counting data.

FIG. 3 illustrates an example flow of a method 300 for adjusting brightness in the field of view of the stereo-optical sensor unit 102. The stereo-optical sensor unit 102 (e.g., via the brightness controller 210) may perform the method 300 in various situations, such as during initialization of the stereo-optical sensor unit 102, during normal operation of the stereo-optical sensor unit 102, and so on. As shown, the method 300 begins in block 302, in which the stereo-optical sensor unit 102 obtains luminosity values from the light sensor 212. The values observed from the light sensor 212 are indicative of a luminosity of the field of view of the stereo-optical camera 204. A low luminosity value may contribute to an inaccurate count of individuals by the stereo-optical sensor unit 102. Further, to process the luminosity values, in block 304, the stereo-optical sensor unit 102 converts analog input obtained from the light sensor 212 to digital input. Once converted, in block 306, the stereo-optical sensor unit 102 extracts the values from the digital input. Values extracted from the digital input could include the raw luminosity values, a timestamp associated with a point in time that the luminosity value was captured, and so on.

In block 308, the stereo-optical sensor unit 102 determines, as a function of the luminosity values, whether to adjust the brightness of the light source 105. In particular, in block 308, the stereo-optical sensor unit 102 evaluates the luminosity values against a specified threshold value (or range). For example, a threshold may be a predetermined level of luminosity, if exceeded, may indicative that a current level of brightness in the light source 105 is too high and may obstruct the field of view. As another example, a luminosity value falling below another threshold may indicate that the current level of brightness in the light source 105 is too low. In either case, the current brightness level may hinder the ability of the stereo-optical sensor unit 102 to accurately count individuals passing through the field of view.

In block 312, the stereo-optical sensor unit 102 determines whether to adjust the brightness of the light source 105. The stereo-optical sensor unit 102 determines to adjust in the event that the luminosity value exceeds (or falls below) a given threshold. In other cases, the stereo-optical sensor unit 102 determines to do so if the luminosity value is outside a specified threshold range. If the stereo-optical sensor unit 102 determines not to adjust the brightness of the light source 105, then the method 300 returns to block 302, in which the stereo-optical sensor unit 102 obtains subsequent luminosity values from the light sensor 212. Otherwise, in block 314, the stereo-optical sensor unit 102 determines whether a threshold is exceeded (or a ceiling value of a threshold range is exceeded). If not, then the luminosity value falls below a specified threshold (or floor value of the threshold range). In such a case, then in block 318, the stereo-optical sensor unit 102 increases the brightness of the light source 105. The degree to which the stereo-optical sensor 102 increases the brightness is determined as a function of the specified threshold and the observed luminosity values. In the event that the luminosity values exceed the specified threshold, then in block 316, the stereo-optical sensor unit 102 decreases the brightness of the light source 105. The degree to which the stereo-optical sensor unit 102 decreases the brightness is determined as a function of the specified threshold and the observed luminosity values.

Further, in block 320, the stereo-optical sensor unit 102 stores data relating to the brightness adjustment in the storage 214 (e.g., as historical data 218). For instance, in block 322, the stereo-optical sensor unit 102 stores a timestamp, the luminosity values observed to be outside of the thresholds, and the amount by which the brightness values were adjusted. As stated, the stereo-optical sensor unit 102 may use the historical data 218 in a variety of manners, such as in predicting when to adjust brightness of the light source 105. In addition, the stereo-optical sensor unit 102 may provide the historical data 218 for the user, e.g., by transmitting the historical data to a management console of the user.

Aspects of the present disclosure may be embodied as a system, method, or computer-readable storage medium. Accordingly, aspects of the present disclosure may take the form of an entirely hardware-based embodiment, an entirely software-based embodiment (e.g., firmware, resident software, micro-code, etc.), or an embodiment combining software and hardware aspects. Further, aspects of the present disclosure may take the form of a computer-readable storage medium having computer-readable instructions embodied thereon.

Any combination of one or more computer-readable storage media may be used. The computer-readable medium may be a computer-readable signal medium or a computer-readable storage medium. A computer-readable storage medium may include an electronic, magnetic, optical, electromagnetic, infrared, semiconductor system, apparatus, device, or any suitable combination of the foregoing. More specific examples include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. IN the current context, a computer-readable storage medium may be any tangible medium that may contain or store a program for use by or in connection with an instruction execution system, apparatus, or device.

It will be readily understood that components of the embodiments as generally disclosed herein and illustrated in the appended figures could be arranged and designed in a wide variety of different configurations. Thus, the following and more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present disclosure may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present disclosure. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment. Many modifications and variations are possible in view of the above disclosure. The embodiments were chosen and described to best explain the principles of the present disclosure and practical applications to thereby enable one of ordinary skill in the art to best use the present disclosure as may be suited to the particular use that is contemplated.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to". The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

What is claimed is:

1. A computer-implemented method for adjusting a brightness of a field of view of a stereo-optical sensor device having one or more light sources, the method comprising:
    obtaining, from one or more light sensors of the stereo-optical sensor device, a plurality of values indicative of a luminosity of the field of view of the stereo-optical sensor device;
    determining, as a function of the plurality of values, whether to adjust a brightness of one or more light sources;
    adjusting, in response to the determination, the brightness of the one or more light sources;
    counting one or more individuals within the field of view of the stereo-optical sensor device;
    maintaining historical lighting data including the plurality of values indicative of the luminosity, a timestamp at which the brightness is adjusted in response to the determination, and an amount by which the brightness is adjusted;
    predicting, based on the historical lighting data, a point in time at which to subsequently adjust the one or more light sources; and
    automatically adjusting the one or more light sources at the point in time.

2. The computer-implemented method of claim 1, wherein determining whether to adjust the brightness of the one or more light sources comprises evaluating the plurality of values with a specified threshold range.

3. The computer-implemented method of claim 2, wherein in response to a determination that the plurality of values exceeds the specified threshold range, increasing the brightness of the one or more light sources.

4. The computer-implemented method of claim 2, wherein in response to a determination that the plurality of values falls below the specified threshold range, decreasing the one or more light sources.

5. The computer-implemented method of claim 1, further comprising storing data relating to the adjustment in a storage.

6. The computer-implemented method of claim 1, wherein obtaining the plurality of values comprises:
    converting analog input from the one or more light sensors to digital input; and
    extracting the plurality of values from the digital input.

7. A computer-readable storage medium comprising instructions, which, when executed on a processor, performs an operation for adjusting a brightness of a field of view of a stereo-optical sensor device having one or more light sources, the operation comprising:
    obtaining, from one or more light sensors of the stereo-optical sensor device, a plurality of values indicative of a luminosity of the field of view of the stereo-optical sensor device;
    determining, as a function of the plurality of values, whether to adjust a brightness of one or more light sources;
    adjusting, in response to the determination, the brightness of the one or more light sources;
    counting one or more individuals within the field of view of the stereo-optical sensor device;
    maintaining historical lighting data including the plurality of values indicative of the luminosity, a timestamp at which the brightness is adjusted in response to the determination, and an amount by which the brightness is adjusted;
    predicting, based on the historical lighting data, a point in time at which to subsequently adjust the one or more light sources; and
    automatically adjusting the one or more light sources at the point in time.

8. The computer-readable storage medium of claim 7, wherein determining whether to adjust the brightness of the one or more light sources comprises evaluating the plurality of values with a specified threshold range.

9. The computer-readable storage medium of claim 8, wherein in response to a determination that the plurality of values exceeds the specified threshold range, increasing the brightness of the one or more light sources.

10. The computer-readable storage medium of claim 8, wherein in response to a determination that the plurality of values falls below the specified threshold range, decreasing the one or more light sources.

11. The computer-readable storage medium of claim 7, further comprising storing data relating to the adjustment in a storage.

12. The computer-readable storage medium of claim 7, wherein obtaining the plurality of values comprises:
    converting analog input from the one or more light sensors to digital input; and
    extracting the plurality of values from the digital input.

13. An apparatus, comprising:
    a stereo-optical camera;
    one or more light sources;
    one or more light sensors; and
    a controller to:
        obtain, from the one or more light sensors, a plurality of values indicative of a luminosity of a field of view of the stereo-optical camera,
        determine, as a function of the plurality of values, whether to adjust a brightness of the one or more light sources,
        adjust, in response to the determination, the brightness of the one or more light sources;
        count one or more individuals within the field of view of the stereo-optical camera;
        maintain historical lighting data including the plurality of values indicative of the luminosity, a timestamp at which the brightness is adjusted in response to the determination, and an amount by which the brightness is adjusted;
        predict, based on the historical lighting data, a point in time at which to subsequently adjust the one or more light sources; and
        automatically adjust the one or more light sources at the point in time.

14. The apparatus of claim 13, wherein to determine whether to adjust the brightness of the one or more light sources comprises to evaluate the plurality of values with a specified threshold range.

15. The apparatus of claim 14, wherein in response to a determination that the plurality of values exceeds the specified threshold range, the brightness of the one or more light sources is increased.

16. The apparatus of claim 14, wherein in response to a determination that the plurality of values falls below the specified threshold range, the brightness of the one or more light sources is decreased.

17. The apparatus of claim 13, wherein to obtain the plurality of values comprises to:

- convert analog input from the one or more light sensors to digital input; and
- extract the plurality of values from the digital input.

* * * * *

UNITED STATES PATENT AND TRADEMARK OFFICE
CERTIFICATE OF CORRECTION

Page 1 of 1

PATENT NO. : 10,778,957 B2
APPLICATION NO. : 16/147394
DATED : September 15, 2020
INVENTOR(S) : Zafar Mohammed Haq It is certified that error appears in the above-identified patent and that said Letters Patent is hereby corrected as shown below:

In the Specification

In Column 2, Line 22, delete "C #," and insert -- C#, --, therefor.

In Column 3, Line 38, delete "memory 108" and insert -- memory 208 --, therefor.

In Column 4, Line 21, delete "sensor unit 216," and insert -- sensor unit 102, --, therefor.

In Column 5, Line 7, delete "indicative" and insert -- indicate --, therefor.

In Column 5, Line 34, delete "sensor 102" and insert -- sensor unit 102 --, therefor.

In the Claims

In Column 8, Line 50, in Claim 13, delete "camera," and insert -- camera; --, therefor.

In Column 8, Line 53, in Claim 13, delete "sources," and insert -- sources; --, therefor.

Signed and Sealed this
Eighth Day of June, 2021

Drew Hirshfeld
*Performing the Functions and Duties of the
Under Secretary of Commerce for Intellectual Property and
Director of the United States Patent and Trademark Office*